United States Patent
Awata et al.

(10) Patent No.: US 9,336,948 B2
(45) Date of Patent: May 10, 2016

(54) LAMINATED CERAMIC ELECTRONIC COMPONENT

(71) Applicant: Murata Manufacturing Co., Ltd., Nagaokakyo-shi, Kyoto-fu (JP)

(72) Inventors: Hiroki Awata, Nagaokakyo (JP); Sui Uno, Nagaokakyo (JP); Takatoshi Sueto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 330 days.

(21) Appl. No.: 14/105,209

(22) Filed: Dec. 13, 2013

(65) Prior Publication Data

US 2014/0177134 A1 Jun. 26, 2014

(30) Foreign Application Priority Data

Dec. 25, 2012 (JP) ................. 2012-281227

(51) Int. Cl.
*H01G 4/30* (2006.01)
*H01G 4/12* (2006.01)
*H01G 4/224* (2006.01)

(52) U.S. Cl.
CPC ............... *H01G 4/1236* (2013.01); *H01G 4/12* (2013.01); *H01G 4/1227* (2013.01); *H01G 4/224* (2013.01); *H01G 4/30* (2013.01)

(58) Field of Classification Search
CPC ......... H01G 4/30; H01G 4/12; H01G 4/1227; H01G 4/248
USPC ................ 361/301.4, 303–305, 306.1, 306.3, 361/321.1, 321.2
See application file for complete search history.

(56) References Cited

U.S. PATENT DOCUMENTS

| 6,125,027 | A | * | 9/2000 | Klee | C03C 17/3417 361/306.1 |
| 8,422,196 | B2 | * | 4/2013 | Kim | H01G 4/30 361/303 |
| 8,797,708 | B2 | * | 8/2014 | Sakuratani | H01L 41/273 361/303 |
| 9,076,599 | B2 | * | 7/2015 | Endo | H01G 4/30 |
| 2006/0187612 | A1 | * | 8/2006 | Yamane | H01G 4/005 361/303 |
| 2007/0211404 | A1 | * | 9/2007 | Kojima | H01G 4/012 361/303 |
| 2009/0207554 | A1 | | 8/2009 | Iguchi et al. | |

(Continued)

FOREIGN PATENT DOCUMENTS

CN 101515502 A 8/2009
CN 102315017 A 1/2012

(Continued)

OTHER PUBLICATIONS

Official Communication issued in corresponding Korean Patent Application No. 10-2013-0157259, mailed on May 28, 2015.

(Continued)

*Primary Examiner* — Nguyen T Ha
(74) *Attorney, Agent, or Firm* — Keating & Bennett, LLP

(57) ABSTRACT

A laminated ceramic capacitor includes a laminate including an inner layer portion including a ceramic dielectric layer and an internal electrode, and an outer layer portion defined by a ceramic dielectric layer. At both end portions of the laminate, external electrodes are connected to the internal electrode. In the outer layer portion, a glass layer is provided. An outer ceramic dielectric layer positioned outwardly of the glass layer has a different color from the color of an inner ceramic dielectric layer positioned inwardly of the glass layer.

20 Claims, 3 Drawing Sheets

(56) References Cited

U.S. PATENT DOCUMENTS

| | | |
|---|---|---|
| 2011/0075321 A1 | 3/2011 | Yamaguchi |
| 2011/0309718 A1 | 12/2011 | Ogawa et al. |

FOREIGN PATENT DOCUMENTS

| | | |
|---|---|---|
| JP | 57-72313 A | 5/1982 |
| JP | 59-94806 A | 5/1984 |
| JP | 3-136308 A | 6/1991 |
| JP | 4-288809 A | 10/1992 |
| JP | 6-215978 A | 8/1994 |
| JP | 2678206 B2 | 11/1997 |
| JP | 2007-242995 A | 9/2007 |
| JP | 2009-283880 A | 12/2009 |
| JP | 2011-14940 A | 1/2011 |
| KR | 10-2009-0090278 A | 8/2009 |

OTHER PUBLICATIONS

Official Communication issued in corresponding Japanese Patent Application No. 2012-281227, mailed on Oct. 28, 2014.

* cited by examiner

LAMINATED CERAMIC ELECTRONIC COMPONENT

BACKGROUND OF THE INVENTION

1. Field of the Invention

The present invention relates to a laminated ceramic electronic component, in particular, a laminated ceramic electronic component, such as a laminated ceramic capacitor, including a laminate including a plurality of ceramic dielectric layers, for example.

2. Description of the Related Art

A laminated ceramic electronic component includes a laminate including a plurality of ceramic dielectric layers and a plurality of internal electrodes disposed alternately on one another; and external electrodes formed at both end portions of the laminate. When mounting this laminated ceramic electronic component on a circuit board, the mounting surface of the circuit board and the surface direction of each of the internal electrodes may be disposed in parallel with each other or orthogonal to each other, depending on a direction of mounting of the laminated ceramic electronic component. In the case of a laminated ceramic capacitor, which is one of such laminated ceramic electronic components, such a positional relationship between the mounting surface of the circuit board and the internal electrode may cause fluctuation of a value of stray capacitance in the laminated ceramic electronic component, with the result that properties of the laminated ceramic electronic component may be negatively affected.

Hence, if the positional relationship between the mounting surface of the circuit board and the surface direction of the internal electrode is the same when mounting the laminated ceramic electronic component on the mounting surface of the circuit board, the variation of properties of the laminated ceramic electronic component can be made small. However, when the laminated ceramic electronic component has a square cross section, it is difficult to find the surface direction of the internal electrode from its appearance. To address this, during manufacturing of the laminated ceramic electronic component, a mark indicating the lamination direction in the laminate is formed on the outer surface of the laminated ceramic electronic component, thereby indicating the surface direction of the internal electrode of the laminated ceramic electronic component. Accordingly, the laminated ceramic electronic component can be mounted on the circuit board while the positional relation between the mounting surface of the circuit board and the surface direction of the internal electrode is maintained to be the same.

During the manufacturing of the laminated ceramic electronic component, the mark is formed in the following manner, for example. That is, on a surface of a dielectric having not been fired yet, an indication mark is formed using a ceramic paste. Then, the dielectric and the indication mark are simultaneously sintered together, thereby obtaining the dielectric having the indication mark. Because the indication mark has been sintered together with the dielectric, the indication mark is never erased or never becomes unclear unlike a conventional indication mark (see Japanese Patent Laying-Open No. 57-72313).

However, for example, in order to form such an indication mark on each of small laminated ceramic electronic components with a length of 1.0 mm×a width of 0.6 mm×a thickness of 0.6 mm, for example, extra steps such as printing and drying are required and positional displacement or the like takes place during the printing. Accordingly, the manufacturing thereof becomes very complicated.

SUMMARY OF THE INVENTION

In view of this, preferred embodiments of the present invention provide a laminated ceramic electronic component, which is easily manufactured and securely allows the surface direction of an internal electrode of the laminated ceramic electronic component to be distinguished.

A laminated ceramic electronic component according to a preferred embodiment of the present invention includes a laminate including an inner layer portion and an outer layer portion, the inner layer portion including a plurality of ceramic dielectric layers each including an internal electrode provided thereon, the outer layer portion including a plurality of ceramic dielectric layers each having no internal electrode provided thereon and positioned outwardly of the inner layer portion; and external electrodes located at both end portions of the laminate, an outer ceramic dielectric layer, which includes an exposed ceramic dielectric layer of the outer layer portion, having a different color from a color of each of an inner ceramic dielectric layer and the inner layer portion, the inner ceramic dielectric layer being positioned inwardly of the outer ceramic dielectric layer, the outer ceramic dielectric layer being made of a perovskite type compound including Ca and Zr, the inner ceramic dielectric layer and the inner layer portion being made of a perovskite type compound including Ba and Ti.

Further, a laminated ceramic electronic component according to another preferred embodiment of the present invention includes a laminate including an inner layer portion and an outer layer portion, the inner layer portion including a plurality of ceramic dielectric layers each including an internal electrode provided thereon, the outer layer portion including a plurality of ceramic dielectric layers each having no internal electrode provided thereon and positioned outwardly of the inner layer portion; and external electrodes located at both end portions of the laminate, an outer ceramic dielectric layer, which includes an exposed ceramic dielectric layer of the outer layer portion, having a different color from a color of each of an inner ceramic dielectric layer and the inner layer portion, the inner ceramic dielectric layer being positioned inwardly of the outer ceramic dielectric layer, when the outer ceramic dielectric layer is dissolved into a solution, the solution including a perovskite type compound including Ca and Zr, when the inner ceramic dielectric layer and the inner layer portion are dissolved into a solution, the solution including a perovskite type compound including Ba and Ti. It should be noted that in a preferred embodiment of the present invention, the expressions "when the outer ceramic dielectric layer is dissolved into a solution" and "when the inner ceramic dielectric layer and the inner layer portion are dissolved into a solution" provide a concept representing a case where the laminate is dissolved into a solution using an acid, a case where the laminate is subjected to alkali fusion and then is dissolved in an acid or the like to obtain a solution, or other cases, for example. There is no particular limitation as to the method of dissolving it into a solution.

Furthermore, a laminated ceramic electronic component according to still another preferred embodiment of the present invention includes a laminate including an inner layer portion and a pair of outer layer portions, the inner layer portion including a plurality of ceramic dielectric layers each including an internal electrode provided thereon, the pair of outer layer portions including a plurality of ceramic dielectric layers each having no internal electrode provided thereon and positioned on both outer sides of the inner layer portion; and external electrodes located at both end portions of the laminate, an outer ceramic dielectric layer, which includes an exposed ceramic dielectric layer of one outer layer portion of the pair of outer layer portions, having a different color from a color of an inner ceramic dielectric layer positioned inwardly of the outer ceramic dielectric layer, the one outer layer portion having a thickness different from a thickness of an other outer layer portion of the pair of outer layer portions.

With the different color, the surface direction of the internal electrode is easily and reliably distinguished. Moreover, an influence of the composition of the outer ceramic dielectric layer having the different color over the inner layer portion can be adjusted.

Preferably, in this case, the one outer layer portion including the ceramic dielectric layer having the different color has a thickness greater than the thickness of the other outer layer portion. Accordingly, the composition providing the different color is prevented from influencing the inner layer portion.

Preferably, in such a laminated ceramic electronic component, the outer ceramic dielectric layer further includes Si, and assuming that a content of the Ca is 1 molar part, the Si has a content a (molar part) satisfying $0.5 \leq a \leq 5.0$. By including a large amount of Si, a glass layer is easily formed between the outer ceramic dielectric layer and the inner ceramic dielectric layer.

Preferably, in such a laminated ceramic electronic component, a glass layer is provided between the outer ceramic dielectric layer and the inner ceramic dielectric layer. Moisture of the atmospheric air may enter the laminate to result in decrease of reliability. To address this, the glass layer is provided between the outer ceramic dielectric layer and the inner ceramic dielectric layer so as to prevent the moisture from entering the inner ceramic dielectric layer. Accordingly, there can be obtained a laminated ceramic electronic component having high reliability.

Preferably, the glass layer is connected to the external electrodes at end surfaces of the laminate. With the glass layer being connected to the external electrodes, the entire surface of the inner ceramic dielectric layer is covered with the glass layer so as to achieve a great effect for prevention of entrance of the moisture of the atmospheric air into the inner ceramic dielectric layer.

Preferably, the glass layer has a thickness of not less than about 0.3 μm, for example. With the thickness of the glass layer being not less than about 0.3 μm, the entrance of the moisture is prevented, such that the effect of improving the reliability of the laminated ceramic electronic component becomes noticeable.

Preferably, the outer ceramic dielectric layer positioned outwardly of the glass layer has more pores than pores in the inner ceramic dielectric layer positioned inwardly of the glass layer.

With a large amount of the glass component in the outer ceramic dielectric layer, a multiplicity of pores can be formed in the outer ceramic dielectric layer after firing. Hence, by applying an electrode paste for the external electrodes to the laminate obtained through the firing, the electrode paste comes into the pores of the outer ceramic dielectric layer. Accordingly, when the external electrodes are formed by sintering the electrode paste, the external electrodes are firmly fixed to the laminate through an anchor effect.

Preferably, the outer ceramic dielectric layer positioned outwardly of the glass layer has a total thickness of about 1.0 μm to about 80 μm, for example. The outer ceramic dielectric layer has the different color from the inner ceramic dielectric layer. However, the ceramic dielectric layer is thin, so that when the number of outer ceramic dielectric layers is small, the color of the inner ceramic dielectric layer may be seen therethrough. Accordingly, by increasing the number of outer ceramic dielectric layers, the difference in color between the inner ceramic dielectric layer and the outer ceramic dielectric layer becomes clear. When the total thickness of the outer ceramic dielectric layer is set at about 1.0 μm to about 80 μm, for example, the difference in the color of the outer ceramic dielectric layer indicating the surface direction of the internal electrode of the laminated ceramic electronic component becomes clear.

The outer ceramic dielectric layer positioned outwardly of the glass layer can have a white color or a black color. Alternatively, the outer ceramic dielectric layer positioned outwardly of the glass layer may have any color as long as it can be distinguished.

According to various preferred embodiments of the present invention, regarding the laminate of the laminated ceramic electronic component, the different color of the side surface of the laminate securely indicates the surface direction of the internal electrode. Accordingly, when mounting the laminated ceramic electronic component on a circuit board or the like, the laminated ceramic electronic component can be mounted on the circuit board in consideration of a positional relationship between the mounting surface of the circuit board and the surface direction of the internal electrode in the laminate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
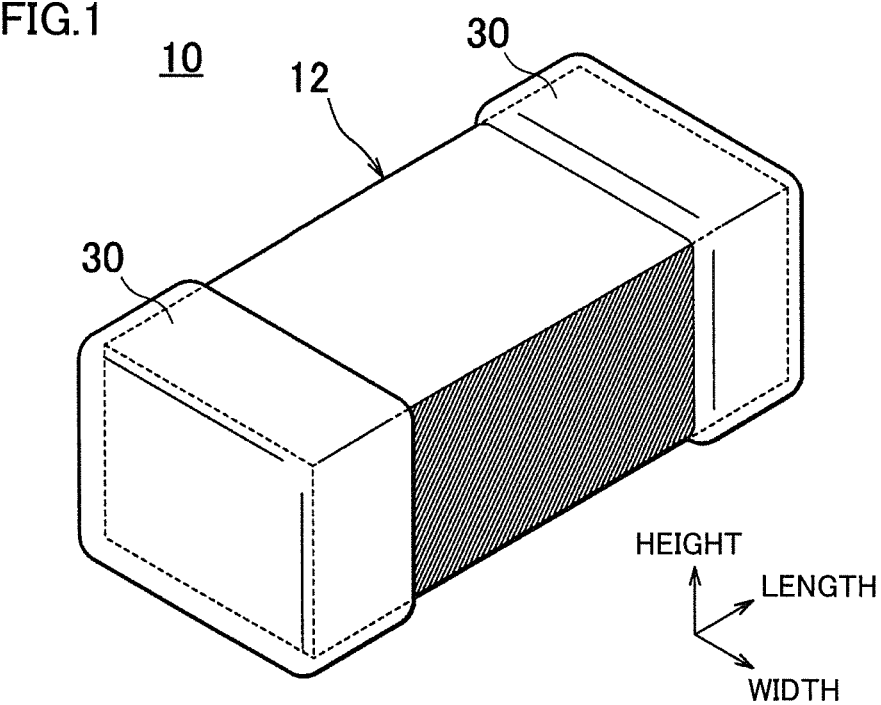
FIG. 1 is a perspective view showing a laminated ceramic capacitor serving as an exemplary laminated ceramic electronic component according to a preferred embodiment of the present invention.

FIG. 1 is a perspective view showing a laminated ceramic capacitor serving as an exemplary laminated ceramic electronic component according to a preferred embodiment of the present invention. There are various sizes for the sizes of laminated ceramic capacitor 10 shown in FIG. 1 in the length direction, the width direction, and the height direction as shown in Table 1. Preferred embodiments of the present invention can be applied to a laminated ceramic electronic component of any of the sizes.

TABLE 1

|  | 0603 Size | 2012 Size | 1005 Size | 1608 Size | 1005 Size |
|---|---|---|---|---|---|
| Length Direction (mm) | 0.6 | 2.0 | 1.0 | 1.6 | 1.0 |

TABLE 1-continued

|  | 0603 Size | 2012 Size | 1005 Size | 1608 Size | 1005 Size |
|---|---|---|---|---|---|
| Width Direction (mm) | 0.3 | 1.2 | 0.5 | 0.8 | 0.5 |
| Height Direction (mm) | 0.3 | 1.2 | 0.5 | 0.8 | 0.3 |

Laminated ceramic capacitor 10 includes a laminate 12 preferably having a rectangular parallelepiped shape, for example. In laminate 12, ceramic dielectric layers and internal electrodes are alternately disposed on one another. Laminate 12 may have a square or rectangular cross sectional shape including the width direction and height direction thereof, for example. Each of the ceramic dielectric layers included in laminate 12 preferably has a thickness of about 0.5 µm to about 5 µm, and the total number of the ceramic dielectric layers therein was 300 to 600, for example.

Figure 2:
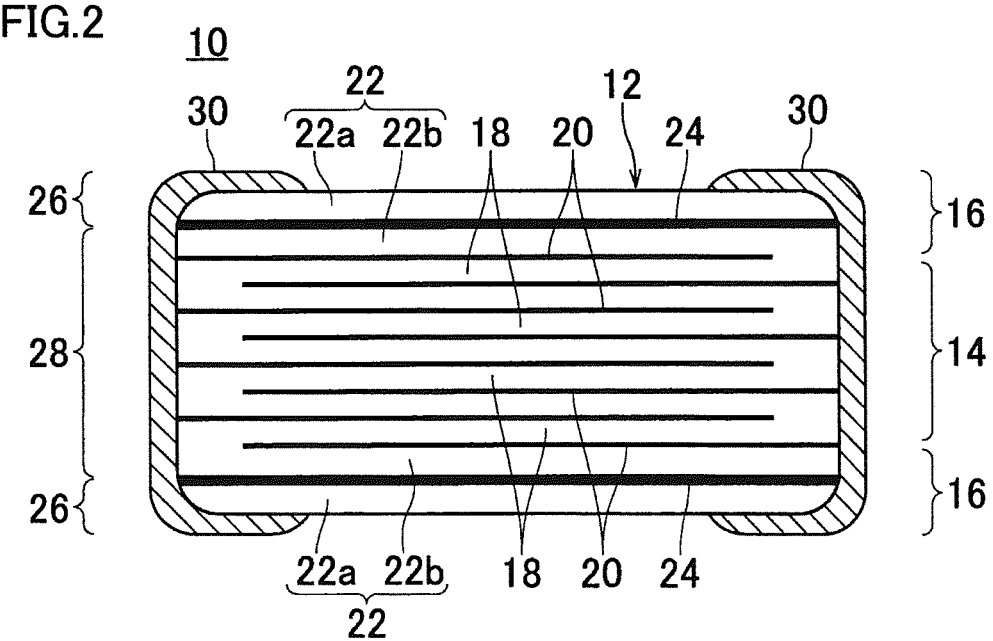
FIG. 2 is a cross sectional view showing an internal structure of the laminated ceramic capacitor shown in FIG. 1.

Laminate 12 includes an inner layer portion 14 and outer layer portions 16 as shown in FIG. 2. Inner layer portion 14 is configured such that a plurality of ceramic dielectric layers 18 and internal electrodes 20 are disposed alternately on one another. Adjacent internal electrodes 20 are arranged to face each other with ceramic dielectric layer 18 interposed therebetween. The plurality of internal electrodes 20 are alternately drawn out from the two facing end surfaces of laminate 12. In other words, adjacent internal electrodes 20 are respectively drawn out from the different end surfaces of laminate 12. Each of internal electrodes 20 is preferably made of, for example, Ni, Cu, or the like. In this example, 200 to 500 internal electrodes 20 are preferably provided.

Each of outer layer portions 16 includes a plurality of ceramic dielectric layers 22 each having no internal electrode provided thereon. Outer layer portions 16 are disposed side by side to sandwich inner layer portion 14 therebetween. In an intermediate portion of each outer layer portion 16, a glass layer 24 is provided. In other words, a ceramic dielectric layer 22a is disposed outwardly of glass layer 24, and a ceramic dielectric layer 22b is disposed inwardly of glass layer 24. Each of ceramic dielectric layers 22a, 22b may be defined by one ceramic dielectric layer, or may be defined by a plurality of ceramic dielectric layers.

An outer ceramic dielectric layer 26 preferably has a color different from that of an inner ceramic dielectric layer 28, and preferably has a white color or a black color. Here, outer ceramic dielectric layer 26 corresponds to ceramic dielectric layer 22a provided in outer layer portion 16 and disposed outwardly of glass layer 24. On the other hand, inner ceramic dielectric layer 28 includes ceramic dielectric layers 18 of inner layer portion 14 and ceramic dielectric layer 22b provided in outer layer portion 16 and disposed inwardly of glass layer 24. It should be noted that glass layer 24 may be provided between inner layer portion 14 and outer layer portion 16. In this case, all the ceramic dielectric layers 22 included in outer layer portion 16 serve as outer ceramic dielectric layer 26, and all the ceramic dielectric layers 18 included in inner layer portion 14 serve as inner ceramic dielectric layer 28. For example, the outer layer portion can have a thickness of about 40 µm, the inner layer portion can have a thickness of about 420 µm, the outer ceramic dielectric layer can have a thickness of about 10 µm, and the inner ceramic dielectric layer can have a thickness of about 480 µm.

Figure 3:
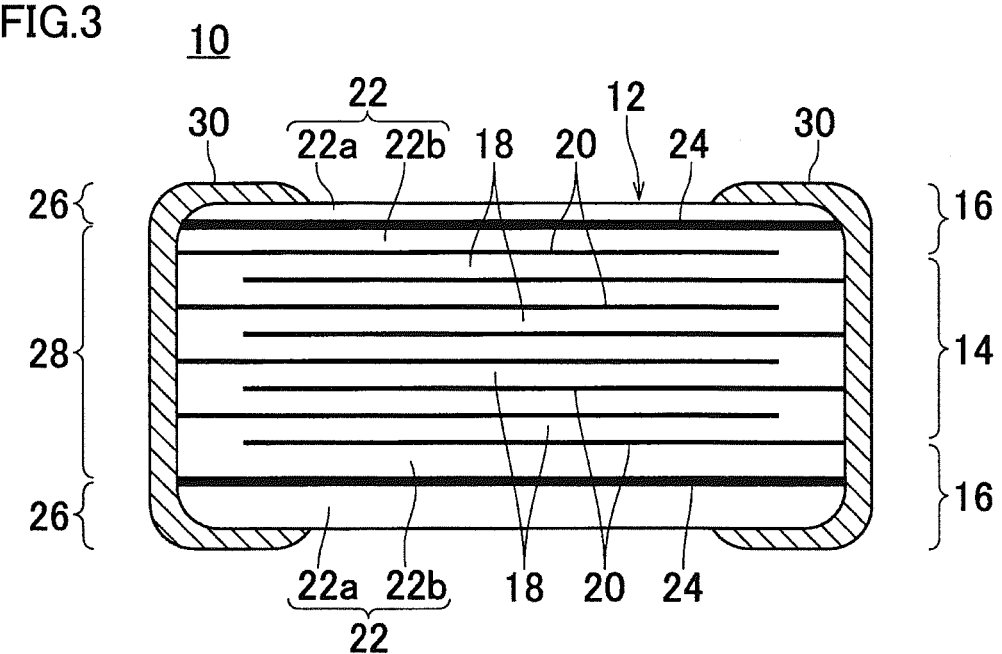
FIG. 3 is a cross sectional view showing another exemplary internal structure of the laminated ceramic capacitor shown in FIG. 1.

Further, outer layer portions 16 disposed side by side to sandwich inner layer portion 14 therebetween may have thicknesses different from each other as shown in FIG. 3. During firing, components of the composition of ceramic dielectric layer 22a may come into inner layer portion 14. However, an influence of the components of the composition thus coming thereinto are adjusted by making the thicknesses of outer layer portions 16 different from each other. In order to provide the different colors to outer ceramic dielectric layer 26 of outer layer portions 16 and inner ceramic dielectric layer 28, the ceramic dielectric layers have the different compositions. In order to prevent the components of the composition of outer ceramic dielectric layer 26 from coming into inner layer portion 14, the ceramic dielectric layer between outer ceramic dielectric layer 26 and inner layer portion 14 may be provided with a relatively large thickness. In this case, glass layer 24 may not be provided. Here, outer layer portions 16 may be set to have different thicknesses such that one of outer layer portions 16 has a thickness of about 20 µm to about 50 µm and the other has a thickness of about 180 µm to about 250 µm, for example. Outer ceramic dielectric layer 26 having the different color may be provided in one outer layer portion or may be provided in the other outer layer portion. Outer ceramic dielectric layers 26 having the different color may be provided in both the outer layer portions. It should be noted that when outer ceramic dielectric layer 26 having the different color is provided in the other outer layer portion having a thickness of about 180 µm to about 250 µm, for example, the ceramic dielectric layer between outer ceramic dielectric layer 26 and inner layer portion 14 preferably is selected to have any thickness falling within a range of about 100 µm to about 150 µm, for example. Because the ceramic dielectric layer between outer ceramic dielectric layer 26 and inner layer portion 14 preferably has a thickness of not less than about 100 µm, the components of the composition of outer ceramic dielectric layer 26 are prevented from coming into inner layer portion 14 and accordingly decreasing reliability, or moisture of the atmospheric air is prevented from entering inner layer portion 14. If the ceramic dielectric layer between outer ceramic dielectric layer 26 and inner layer portion 14 has a thickness of not less than about 150 µm, the thickness of outer layer portion 16 becomes too thick, with the result that the entire thickness of the laminate becomes large. This hinders downsizing of the laminated ceramic electronic component. For example, the thickness of one outer ceramic dielectric layer is set at about 30 µm, the thickness between the one outer ceramic dielectric layer and inner ceramic dielectric layer 28 is set at 0 µm, the thickness of the other outer ceramic dielectric layer is set at about 70 µm, the thickness between the other outer ceramic dielectric layer and the inner ceramic dielectric layer is set at about 120 µm, the thickness of the inner layer portion is set at about 600 µm, and the color of the other outer ceramic dielectric layer 26 is made different from the color of each of inner ceramic dielectric layer 28 and one outer ceramic dielectric layer 26.

Outer ceramic dielectric layer 26 is formed to have a color different from inner ceramic dielectric layer 28, for example, is formed to have a white color or a black color. Accordingly, the side surface of laminate 12 at the end portion in the lamination direction (side surface inclusive of the width direction and the length direction of FIG. 1) can be distinguished from the side surface thereof where the end portion of inner ceramic dielectric layer 28 is exposed (side surface inclusive of the height direction and the length direction of FIG. 1). In other words, based on the color of outer ceramic dielectric layer 26, the side surfaces of laminate 12 at both the end portions in the lamination direction can be distinguished. Here, outer ceramic dielectric layer 26 may be defined by one ceramic dielectric layer 22a, but ceramic dielectric layer 22a is thin, so that it is considered that the color therebelow may be seen therethrough. To address this, outer ceramic dielectric layer 26 includes a plurality of ceramic dielectric layers 22a, and the total thickness thereof is preferably about 1.0 μm to about 80 μm so as to improve visibility of the color of outer ceramic dielectric layer 26.

The composition of ceramic dielectric layer 22a of outer ceramic dielectric layer 26 may include a perovskite type compound including Ca and Zr, and Si and Mn as additive materials, for example. Here, assuming that the content of Ca is 1 molar part, a content a (molar part) of Si is adjusted to satisfy $0.5 \leq a \leq 3.0$ and a content b (molar part) of Mn is adjusted to satisfy $0.1 \leq b \leq 4.0$. Further, the composition of ceramic dielectric layer 22a of outer ceramic dielectric layer 26 may include a perovskite type compound including Ba and Ti, and Si as an additive material, for example. Here, assuming that the content of Ba is 1 molar part, content a (molar part) of Si is $0.5 \leq a \leq 3.0$, and additive materials such as Mn and Mg are not included or are included by a slight amount for the purpose of adjustment of color. For example, by increasing the amount of the additive materials, a black color is attained. By decreasing the amount of the additive materials, a white color is attained. When outer ceramic dielectric layer 26 having such a composition is formed into powders, is dissolved with an acid, and is subjected to an ICP emission spectral analysis, it can be confirmed that ceramic dielectric layer 22a of outer ceramic dielectric layer 26 has the above-described composition.

Meanwhile, the composition of each of ceramic dielectric layers 18, 22b of inner ceramic dielectric layer 28 preferably includes a perovskite type compound including Ti and Ba, and Mn, Si, and Mg as additive materials. Here, assuming that the content of Ba is 1 molar part, a content c (molar part) of Mn is adjusted to satisfy $0.1 \leq c \leq 0.5$, a content d (molar part) of Si is adjusted to satisfy $0.5 \leq d \leq 3.0$, and a content e (molar part) of Mg is adjusted to satisfy $0.2 \, e \leq 1.5$. When inner ceramic dielectric layer 28 having such a composition is formed into powders, is dissolved with an acid, and is subjected to an ICP emission spectral analysis, it can be confirmed that ceramic dielectric layers 18, 22b of inner ceramic dielectric layer 28 have the above-described composition.

Thus, in the case where the composition of outer ceramic dielectric layer 26 and the composition of inner ceramic dielectric layer 28 are different from each other, a rate of shrinkage will differ during firing between outer ceramic dielectric layer 26 positioned outwardly of the glass layer and inner ceramic dielectric layer 28 positioned inwardly of the glass layer. Accordingly, a crack or the like may take place between outer ceramic dielectric layer 26 positioned outwardly of glass layer 24 and inner ceramic dielectric layer 28 positioned inwardly of glass layer 24. If moisture of the atmospheric air enters from this crack, an insulation resistance value will be decreased, thus decreasing reliability of laminated ceramic capacitor 10. However, with glass layer 24 being provided, the crack is prevented from being formed, and moisture of the atmospheric air is prevented from entering even if the crack is formed. Accordingly, a decrease of the insulation resistance value of laminated ceramic capacitor 10 is prevented, so as to obtain a laminated ceramic capacitor 10 with high reliability.

In order to attain such an effect, glass layer 24 is preferably arranged to cover the entire surface of inner ceramic dielectric layer 28 positioned inwardly of glass layer 24. Thus, glass layer 24 is connected to a below-described external electrode located at each of the end portions of laminate 12.

Glass layer 24 preferably has a thickness of not less than about 0.3 μm and less than about 3.0 μm, for example. The thickness of glass layer 24 can be measured by polishing laminate 12 from its surface inclusive of the width direction and the height direction. If the thickness of glass layer 24 is less than about 0.3 μm, the effect of improvement of reliability against the entrance of moisture of the atmospheric air cannot be attained. On the other hand, if the thickness of glass layer 24 is not less than about 3.0 μm, an excess amount of an additive such as Si is used to form glass layer 24, with the result that the mechanical strength of ceramic dielectric layer 22b is decreased. In this laminated ceramic capacitor 10, a component included in outer ceramic dielectric layer 26 and a component included in inner ceramic dielectric layer 28 react with each other during firing, thus depositing glass layer 24 between outer ceramic dielectric layer 26 and inner ceramic dielectric layer 28.

At the end portions of laminate 12 in the longitudinal direction, external electrodes 30 are provided. Each of external electrodes 30 is arranged to extend from the end surface of laminate 12 onto four side surfaces thereof. External electrode 30 is preferably formed in the following manner. That is, the end portion of laminate 12 is soaked in an electrode paste, and is then sintered, thus forming an underlying metal layer. On this underlying metal layer, Ni plating and Sn plating are provided, thus forming external electrode 30. It should be noted that the underlying metal layer extending onto the side surfaces of laminate 12 preferably has a thickness of about 20 μm, for example. The thickness thereof is appropriately selected in a range of about 10 μm to about 20 μm, for example. Further, the underlying metal layer at the end surface of laminate 12 preferably has a thickness of about 20 μm, for example. The thickness thereof is appropriately selected in a range of about 10 μm to about 20 μm, for example. The thickness of the Ni plating layer is preferably in a range of about 1.5 μm to about 6.0 μm, and the thickness of the Sn plating layer is preferably in a range of about 1.0 μm to about 8.0 μm, for example.

It should be noted that depending on the amount of the glass component of outer ceramic dielectric layer 26 of laminate 12, a multiplicity of pores can be formed in outer ceramic dielectric layer 26. Hence, by forming more pores in outer ceramic dielectric layer 26 than those in inner ceramic dielectric layer 28, the electrode paste comes into the pores of outer ceramic dielectric layer 26 when soaking laminate 12 into the electrode paste. Accordingly, an anchor effect is attained between external electrode 30 and laminate 12, thus obtaining external electrode 30 firmly fixed to the end portion of laminate 12.

It should be noted that a mark may be formed on the outer surface of outer ceramic dielectric layer 26 outwardly of glass layer 24 by, for example, ink jet printing, printing, ink transfer, or the like. By forming the mark in this way, the visibility of the end surface of laminate 12 in the lamination direction is further improved. In this case, as an ink used to form the mark, a conductive paste used to form internal electrode 20 may be used.

Figure 4:
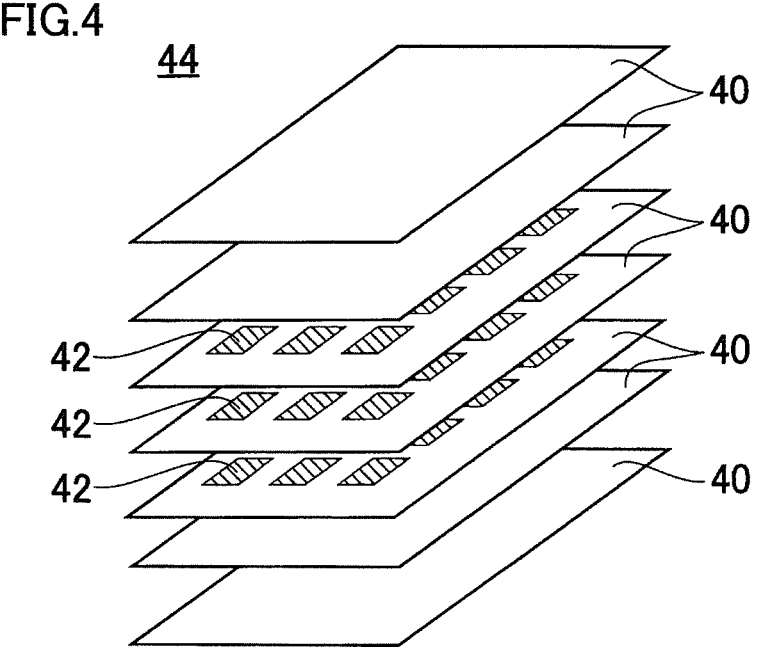
FIG. 4 shows one step for manufacturing the laminated ceramic capacitor shown in FIG. 1 and FIG. 2.

The above-described laminated ceramic capacitor 10 is fabricated preferably using a below-described method of manufacturing the laminated ceramic capacitor. In order to fabricate this laminated ceramic capacitor 10, first, respective powders of $CaCO_3$ and $ZrO_2$ each having a purity of 99 weight % or more are prepared as materials for forming the ceramic dielectric layer. As materials for forming the ceramic dielectric layer having the different color, respective powders of $BaCO_3$ and $TiO_2$ each having a purity of 99 weight % or more are prepared. These powders are calcinated in the atmospheric air at 1100° C. to 1300° C. for 2 hours, thus synthesizing a perovskite type compound including Ca and Zr and a perovskite type compound including Ba and Ti. After the synthesis thereof, they are crushed, thus obtaining main component powders, which are a main component for forming the ceramic dielectric layer. It should be noted that the method of producing the main component powders is not particularly limited. Various known methods can be used, such as a solid phase method and a hydrothermal method, for example. Moreover, the materials are not particularly limited, and can be in various forms, such as carbonate, oxide, hydroxide, and chloride, for example. Further, the main component powders may include an inevitable impurity such as $HfO_2$, for example. Further, the integral width of the (202) diffraction peak of the main component powders is measured in accordance with XRD. It should be noted that the integral width is a value obtained by dividing the area surrounding a curve representing a peak shape by the height of the peak. Next, as the additive materials, respective powders of $SiO_2$, $MnCO_3$, and $Mg_2O_3$ are prepared. These powders are measured such that the content of Si becomes a molar part (a falls within a range of 0.5 to 3.0) and the content of Mn became b molar part (b falls in a range of 0.1 to 4.0) with respect to 1 molar part of the Ca content of the main component powders for the ceramic dielectric layer, and then these powders are mixed with the main component powders, thus obtaining a formulation. Thereafter, this formulation is subjected to wet blending using a ball mill, and is then dried and crushed to obtain dielectric raw material powders. In a similar manner, dielectric raw material powders are obtained such that the content of Si becomes c molar part (c falls in the range of 0.5 to 5.0), the content of Mn becomes d molar part (d falls in a range of 0.1 to 0.5), and the content of Mg becomes e molar part (e falls in a range of 0.2 to 1.5) with respect to 1 molar part of the content of Ba. Next, ceramic green sheets 40 formed of these dielectric materials are prepared. Then, as shown in FIG. 4, a plurality of quadrangular internal electrode patterns 42 are formed on ceramic green sheet 40 using a conductive paste. Internal electrode patterns 42 are formed through, for example, screen printing, gravure printing, or the like, for example.

Next, a plurality of ceramic green sheets 40 having no internal electrode patterns formed thereon are disposed on one another, thus forming a portion corresponding to outer layer portion 16. On the portion, the plurality of ceramic green sheets 40 having internal electrode patterns 42 formed thereon are disposed, thus forming a portion corresponding to inner layer portion 14. Further, a plurality of ceramic green sheets 40 having no internal electrode patterns formed thereon are disposed, thus forming a portion corresponding to outer layer portion 16. By disposing these ceramic green sheets 40 on one another, a mother laminate 44 is formed.

It should be noted that ceramic green sheet 40 to be outer ceramic dielectric layer 26 and ceramic green sheet 40 to be inner ceramic dielectric layer 28 after firing are preferably formed by selecting the dielectric materials to provide different colors as described above. For example, the ceramic green sheet made of the dielectric material of the perovskite type compound including Ca and Zr as the main component may be used for outer ceramic dielectric layer 26, and the ceramic green sheet made of the dielectric material of the perovskite type compound including Ba and Ti as the main component may be used for inner ceramic dielectric layer 28.

After forming mother laminate 44, a flat-plate-shaped mold is used for pressing. Mother laminate 44 thus pressed is cut into green chips to obtain individual laminates 12. The method of cutting mother laminate 44 may be cutting by a dicer or cutting by a force-cutting blade, for example.

Next, each of the green chips is fired, thus obtaining laminate 12 having internal electrodes 20. It should be noted that barrel polishing may be performed before and after the firing, so as to provide a rounded corner portion of the green chip or laminate 12. The green chip is fired at a temperature of approximately 1200° C. to approximately 1300° C. By firing the green chip, glass is deposited between outer ceramic dielectric layer 26 and inner ceramic dielectric layer 28 of laminate 12, thus forming glass layer 24.

Figure 5:
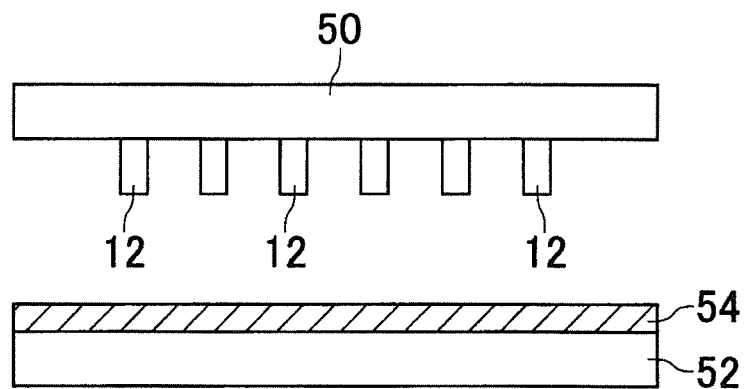
FIG. 5 shows a step of forming external electrodes in a laminate obtained through the step shown in FIG. 4.

Further, as shown in FIG. 5, with one end portion of laminate 12 being held by a holder 50, the other end portion of laminate 12 is soaked in an electrode paste layer 54 on a base 52. The electrode paste attached to the end portion of laminate 12 is sintered, thus forming the underlying electrode. On this underlying electrode, Ni plating and Sn plating are provided, thus forming external electrode 30.

Figure 6:
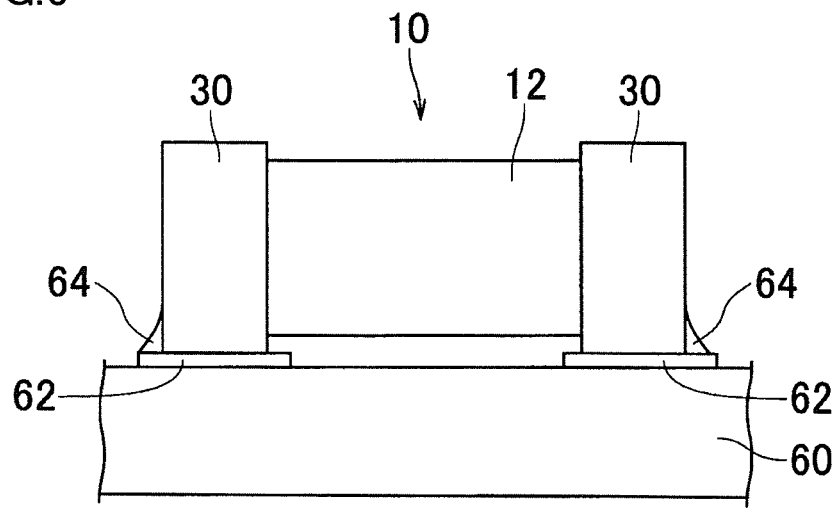
FIG. 6 shows a state in which the laminated ceramic capacitor shown in FIG. 1 is mounted on a circuit board.

Laminated ceramic capacitor 10 obtained in this way is connected to lands 62, which are provided in a circuit board 60, by solder 64 as shown in FIG. 6. In this case, for example, external electrodes 30 of laminated ceramic capacitor 10 are held by lands 62 using a soldering paste, and are soldered to lands 62 through reflow.

In laminated ceramic capacitor 10, the side surface of laminate 12 at the end portion in the lamination direction is distinguishable by the special color. Therefore, when mounting laminated ceramic capacitor 10 such that the mounting surface of the circuit board and the surface direction of internal electrode 20 are parallel or substantially parallel with each other, laminated ceramic capacitor 10 may be mounted on the circuit board such that the side surface, which is distinguishable by the color, of laminate 12 at the end portion in the lamination direction is positioned as the upper surface thereof. On the other hand, when mounting laminated ceramic capacitor 10 such that the mounting surface of the circuit board and the surface direction of internal electrode 20 are perpendicular or substantially perpendicular to each other, laminated ceramic capacitor 10 may be mounted such that the side surface, which is distinguishable by the color, of laminate 12 at the end portion in the lamination direction is perpendicular or substantially perpendicular to the circuit board.

In the case where laminated ceramic capacitor 10 is mounted such that the mounting surface of the circuit board and the surface direction of internal electrode 20 are parallel or substantially parallel with each other, laminated ceramic capacitor 10 is taped to a wrapping material (tape) such that the surface distinguished by the color faces upward or downward. If the surface distinguished by the color is provided with a mark made by ink jet printing, printing, ink transfer, or the like, visibility is further improved.

Preferred embodiments of the present invention can be applied to not only a laminated ceramic capacitor, but also a laminated ceramic electronic component, which is influenced in its properties by a positional relation between a circuit board and an internal electrode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A laminated ceramic electronic component comprising:
a laminate including an inner layer portion and an outer layer portion, the inner layer portion including a plurality of ceramic dielectric layers each including an internal electrode provided thereon, the outer layer portion including a plurality of ceramic dielectric layers each having no internal electrode provided thereon and positioned outwardly of the inner layer portion; and external electrodes located at both end portions of the laminate; wherein
an outer ceramic dielectric layer, which includes an exposed ceramic dielectric layer of the outer layer portion, has a different color from a color of each of an inner ceramic dielectric layer and the inner layer portion, the inner ceramic dielectric layer being positioned inwardly of the outer ceramic dielectric layer;
the outer ceramic dielectric layer is made of a perovskite type compound including Ca and Zr;
the inner ceramic dielectric layer and the inner layer portion are made of a perovskite type compound including Ba and Ti.

2. The laminated ceramic electronic component according to claim 1, wherein
the outer ceramic dielectric layer further includes Si; and assuming that a content of the Ca is 1 molar part, the Si has a molar part content a satisfying $0.5 \leq a \leq 5.0$.

3. The laminated ceramic electronic component according to claim 1, wherein a glass layer is provided between the outer ceramic dielectric layer and the inner ceramic dielectric layer.

4. The laminated ceramic electronic component according to claim 3, wherein the glass layer is connected to the external electrodes at end surfaces of the laminate.

5. The laminated ceramic electronic component according to claim 4, wherein the glass layer has a thickness of not less than about 0.3 μm.

6. The laminated ceramic electronic component according to claim 3, wherein the outer ceramic dielectric layer positioned outwardly of the glass layer has more pores than pores in the inner ceramic dielectric layer positioned inwardly of the glass layer.

7. The laminated ceramic electronic component according to claim 3, wherein the outer ceramic dielectric layer positioned outwardly of the glass layer has a total thickness of about 1.0 μm to about 80 μm.

8. The laminated ceramic electronic component according to claim 3, wherein the outer ceramic dielectric layer positioned outwardly of the glass layer has a white color.

9. The laminated ceramic electronic component according to claim 3, wherein the outer ceramic dielectric layer positioned outwardly of the glass layer has a black color.

10. A laminated ceramic electronic component comprising:
a laminate including an inner layer portion and an outer layer portion, the inner layer portion including a plurality of ceramic dielectric layers each including an internal electrode provided thereon, the outer layer portion including a plurality of ceramic dielectric layers each having no internal electrode provided thereon and positioned outwardly of the inner layer portion; and
external electrodes located at both end portions of the laminate; wherein
an outer ceramic dielectric layer, which includes an exposed ceramic dielectric layer of the outer layer portion, has a different color from a color of each of an inner ceramic dielectric layer and the inner layer portion, the inner ceramic dielectric layer being positioned inwardly of the outer ceramic dielectric layer;
when the outer ceramic dielectric layer is dissolved into a first solution, the first solution includes a perovskite type compound including Ca and Zr;
when the inner ceramic dielectric layer and the inner layer portion are dissolved into a second solution, the second solution includes a perovskite type compound including Ba and Ti.

11. The laminated ceramic electronic component according to claim 10, wherein
the outer ceramic dielectric layer further includes Si; and assuming that a content of the Ca is 1 molar part, the Si has a molar part content a satisfying $0.5 \leq a \leq 5.0$.

12. The laminated ceramic electronic component according to claim 10, wherein a glass layer is provided between the outer ceramic dielectric layer and the inner ceramic dielectric layer.

13. The laminated ceramic electronic component according to claim 12, wherein the glass layer is connected to the external electrodes at end surfaces of the laminate.

14. The laminated ceramic electronic component according to claim 12, wherein the glass layer has a thickness of not less than about 0.3 μm.

15. The laminated ceramic electronic component according to claim 12, wherein the outer ceramic dielectric layer positioned outwardly of the glass layer has more pores than pores in the inner ceramic dielectric layer positioned inwardly of the glass layer.

16. The laminated ceramic electronic component according to claim 12, wherein the outer ceramic dielectric layer positioned outwardly of the glass layer has a total thickness of about 1.0 μm to about 80 μm.

17. The laminated ceramic electronic component according to claim 12, wherein the outer ceramic dielectric layer positioned outwardly of the glass layer has a white color.

18. The laminated ceramic electronic component according to claim 12, wherein the outer ceramic dielectric layer positioned outwardly of the glass layer has a black color.

19. A laminated ceramic electronic component comprising:
a laminate including an inner layer portion and a pair of outer layer portions, the inner layer portion including a plurality of ceramic dielectric layers each including an internal electrode provided thereon, the pair of outer layer portions including a plurality of ceramic dielectric layers each having no internal electrode provided thereon and positioned on both outer sides of the inner layer portion; and
external electrodes located at both end portions of the laminate; wherein
an outer ceramic dielectric layer, which includes an exposed ceramic dielectric layer of one outer layer portion of the pair of outer layer portions, has a different color from a color of an inner ceramic dielectric layer positioned inwardly of the outer ceramic dielectric layer;
the one outer layer portion having a thickness different from a thickness of another outer layer portion of the pair of outer layer portions.

20. The laminated ceramic electronic component according to claim 19, wherein the one outer layer portion including the outer ceramic dielectric layer having the different color has a thickness that is greater than a thickness of the other outer layer portion.

* * * * *